United States Patent [19]

Etzbach et al.

[11] Patent Number: 4,939,118
[45] Date of Patent: Jul. 3, 1990

[54] TRANSFER OF AZO DYES HAVING A PYRIDINE COUPLING COMPONENT

[75] Inventors: Karl-Heinz Etzbach, Frankenthal; Günther Lamm, Hassloch; Hermann Loeffler, Speyer; Helmut Reichelt, Neustadt; Ruediger Sens, Mannheim, all of Fed. Rep. of Germany

[73] Assignee: BASF Aktiengesellschaft, Ludwigshafen, Fed. Rep. of Germany

[21] Appl. No.: 364,153

[22] Filed: Jun. 12, 1989

[30] Foreign Application Priority Data

Jun. 15, 1988 [DE] Fed. Rep. of Germany ....... 3820313

[51] Int. Cl.$^5$ .................. B41M 5/035; B41M 5/26
[52] U.S. Cl. ........................... 503/227; 8/471; 428/195; 428/913; 428/914
[58] Field of Search .................. 8/471; 428/195, 913, 428/914; 503/227

[56] References Cited

U.S. PATENT DOCUMENTS 4,614,521 9/1986 Niwa et al. .................. 503/227

FOREIGN PATENT DOCUMENTS

| 258856 | 7/1979 | European Pat. Off. | 503/227 |
|--------|--------|--------------------|---------|
| 111004 | 6/1984 | European Pat. Off. | 503/227 |
| 340722 | 8/1989 | European Pat. Off. | 503/227 |
| 3330155 | 3/1985 | Fed. Rep. of Germany | 534/766 |
| 30392 | 4/1985 | Japan | 503/227 |
| 199997 | 2/1986 | Japan | 503/227 |
| 237694 | 2/1986 | Japan | 503/227 |
| 227092 | 8/1986 | Japan | 503/227 |
| 127392 | 9/1986 | Japan | 503/227 |
| 283595 | 9/1986 | Japan | 503/227 |
| 2259882 | 10/1977 | United Kingdom | 503/227 |
| 2159971 | 12/1985 | United Kingdom | 503/227 |

Primary Examiner—Bruce H. Hess
Attorney, Agent, or Firm—Oblon, Spivak, McClelland, Maier & Neustadt

[57] ABSTRACT

Azo dyes are transferred from a substrate to a plastic-coated paper by diffusion with the aid of a thermal printing head, these azo dyes having the formula

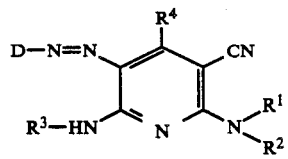

where
D is the radical of a diazo component and
$R^1$, $R^2$ and $R^3$ are each independently of the others hydrogen, substituted or unsubstituted alkyl, substituted or unsubstituted phenyl or substituted or unsubstituted cyclohexyl and
$R^4$ is alkyl.

2 Claims, No Drawings

TRANSFER OF AZO DYES HAVING A PYRIDINE COUPLING COMPONENT

The present invention relates to a novel process for transferring azo dyes having a diaminopyridine-based coupling component from a substrate to a plastic-coated paper with the aid of a thermal printing head.

In thermotransfer printing processes, a transfer sheet which contains a thermally transferable dye in one or more binders with or without suitable assistants on a substrate is heated from the back with a thermal printing head in short heat pulses (duration: fractions of a second), as a result of which the dye migrates out of the transfer sheet and diffuses into the surface coating of a receiving medium. The essential advantage of this process is that control of the amount of dye to be transferred (and hence of the color gradation) is easily possible by adjusting the energy to be supplied to the thermal printing head.

In general, color recording is carried out using the three subtractive primaries yellow, magenta and cyan (and in certain cases black). To facilitate optimal color recording, the dyes must have the following properties:

(i) ready thermal transferability, (ii) low migration tendency within or on the surface coating of the receiving medium at room temperature, (iii) high thermal and photochemical stability and resistance to moisture and chemical substances, (iv) suitable hues for subtractive color mixing, (v) a high molar adsorption coefficient, (vi) resistance to crystallization in the course of storage of the transfer sheet and (vii) ready industrial accessibility.

These requirements are from experience very difficult to meet at one and the same time.

For this reason most of the known cyan dyes used for thermal transfer printing do not meet the required range of properties.

There is prior art concerning dyes used in thermotransfer printing processes. For instance, EP-A-216,483 and EP-A-258,856 describe azo dyes from thiophene-based diazo components and aniline-based coupling components.

Furthermore, EP-A-218,397 describes thiophene- and aniline-based disazo dyes for this purpose.

JP-A-30,392/1985 teaches the use of azo dyes which have a diazo component based on 5-aminothia-2,4-diazole and a coupling component based on aniline.

Finally, JP-A-227,092/1986 discloses the used of azo dyes whose diazo and coupling components come from the aniline series.

It is an object of the present invention to provide a process for the transfer of dyes where the dyes should ideally meet all the abovementioned requirements (i) to (vii).

We have found that this object is achieved in an advantageous manner by transferring azo dyes from a substrate to a plastic-coated paper by diffusion with the aid of a thermal printing head on using a substrate on which there are one or more azo dyes of the formula I

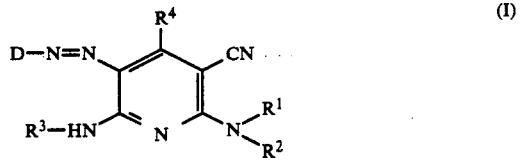

where
$R^1$, $R^2$ and $R^3$ are identical or different and each is independently of the others alkyl, alkoxyalkyl, alkanoyloxyalkyl, alkoxycarbonyloxyalkyl or alkoxycarbonylalkyl, which each may have up to 20 carbon atoms and be substituted by phenyl, $C_1$–$C_4$-alkylphenyl, $C_1$–$C_4$-alkoxyphenyl, halophenyl, benzyloxy, $C_1$–$C_4$-alkylbenzyloxy, $C_1$–$C_4$-alkoxybenzyloxy, halobenzyloxy, halogen, hydroxyl or cyano, or are each hydrogen, unsubstituted or $C_1$–$C_{15}$-alkyl-, $C_1$–$C_{15}$-alkoxy-, halogen- or benzyloxy-substituted phenyl, unsubstituted or $C_1$–$C_{15}$-alkyl-, $C_1$–$C_{15}$-alkoxy, halo- gen- or benzyloxy-substituted cyclohexyl or a radical of the formula II $$[-Y-O]_m-R^5 \qquad (II)$$

where
Y is $C_2$–$C_6$-alkylene,
m is 1, 2, 3, 4, 5, or 6 and
$R^5$ is $C_1$–$C_4$-alkyl or unsubstituted or $C_1$–$C_4$-alkyl- or $C_1$–$C_4$-alkoxy-substituted phenyl,
$R^4$ is $C_1$–$C_4$-alkyl and
D is the radical of a diazo component.

The radical D in the formula I is derived for example from a diazo component which comes from the aniline, phenylazoanline, aminothiophene, phenylazoaminothiophene, aminothiazole, phenylazoaminothiazole, aminoisothiazole or aminothiadiazole series.

Preference is given to the use of dyes of the formula I where the radical D is derived for example from a diazo component D-$NH_2$ of the formula

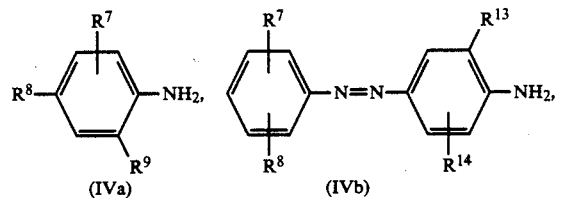

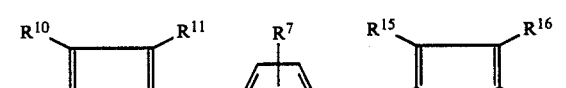

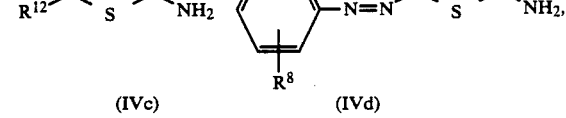

-continued

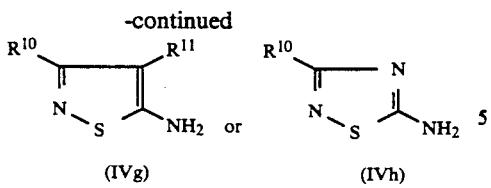

(IVg)   (IVh)

where $R^7$, $R^8$ and $R^9$ are identical or different and each is independently of the others alkyl, alkoxyalkyl, alkoxycarbonylalkyl or alkanoyloxyalkyl, which may each have up to 12 carbon atoms, hydrogen, cyano, halogen, nitro, or a radical of the formula II $$[-Y-O]_m R^5 \quad (II),$$

where Y, $R^5$ and m are each as defined above, or a radical of the formula $-CO-OR^{17}$, $-CO-NR^{17}R^{18}$, $-SO_2-R^{17}$, $-SO_2-OR^{17}$ or $-SO_2-NR^{17}R^{18}$, where $R^{17}$ and $R^{18}$ are identical or different and each is independently of the other alkyl, alkoxyalkyl, alkoxycarbonylalkyl or alkanoyloxyalkyl, which may each have up to 12 carbon atoms, hydrogen or a radical of the formula II $$[-Y-O]_m-R^5 \quad (II),$$

where Y, $R^5$ and m are each as defined above, $R^{10}$ is hydrogen, chlorine, cyano, $C_1$–$C_8$-alkyl, $C_1$–$C_8$-alkoxy, $C_1$–$C_8$-alkylthio, alkoxyalkyl of up to 8 carbon atoms, phenyl, which may be substituted by $C_1$–$C_4$-alkyl, $C_1$–$C_4$-alkoxy or benzyloxy, benzyl, benzyloxy or a radical of the formula $-CO-OR^{17}$ or $-CO-NR^{17}R^{18}$ where $R^{17}$ and $R^{18}$ are each as defined above, $R^{11}$ is hydrogen, cyano, nitro or a radical of the formula $-CO-OR^{17}$ or $-CO-NR^{17}R^{18}$ where $R^{17}$ and $R^{18}$ are each as defined above, $R^{12}$ is cyano, nitro, formyl or a radical of the formula

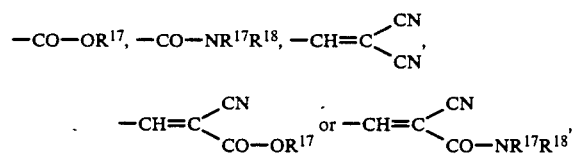

where $R^{17}$ and $R^{18}$ are each as defined above, $R^{13}$ $R^{14}$ are identical or different and each is independently of the other hydrogen, $C_1$–$C_4$-alkyl, $C_1$–$C_4$-alkoxy, chlorine, cyano, nitro or a radical of the formula $-CO-OR^{17}$ or $-CO-NR^{17}R^{18}$ where $R^{17}$ and $R^{18}$ are each as defined above, $R^{15}$ is hydrogen, $C_1$–$C_4$-alkyl or chlorine, and $R^{16}$ is cyano or a radical of the formula $-CO-OR^{17}$ or $-CO-NR^{17}R^{16}$ where $R^{17}$ and $R^{18}$ are each as defined above.

Any alkyl in the abovementioned formula can be linear or branched.

Y is for example ethylene, 1,2- or 1,3-propylene, 1,2-, 1,3- 1,4- or 2,3-butylene, pentamethylene, hexamethylene or 2-methylpentamethylene.

$R^1$, $R^2$, $R^3$, $R^4$, $R^5$, $R^7$, $R^8$, $R^9$, $R^{10}$, $R^{13}$, $R^{14}$, $R^{15}$, $R^{17}$ and $R^{18}$ are each for example methyl, ethyl, propyl, isopropyl, butyl, isobutyl, sec-butyl or tert-butyl.

$R^1$, $R^2$, $R^3$, $R^7$, $R^8$, $R^9$, $R^{10}$, $R^{17}$ and $R^{18}$ are each further for example pentyl, isopentyl, neopentyl, tert-pentyl, hexyl, 2-methylpentyl, heptyl, octyl, 2-ethylhexyl or isooctyl.

$R^1$, $R^2$, $R^3$, $R^7$, $R^8$, $R^9$, $R^{17}$ and $R^{18}$ are each further for example nonyl, isononyl, decyl, isodecyl, undecyl or dodecyl.

$R^1$, $R^2$ and $R^3$ are each further for example tridecyl, isotridecyl, tetradecyl, pentadecyl, hexadecyl, heptadecyl, octadecyl, nonadecyl or eicosyl. (The terms isooctyl, isononyl, isodecyl and isotridecyl are trivial names due to alcohols obtained by the oxo process (cf. Ullmanns Enzyklopädie der technischen Chemie, 4th edition, volume 7, pages 215–217 and volume 11, pages 435 and 436).)

$R^1$, $R^2$, $R^3$, $R^7$, $R^8$, $R^9$, $R^{17}$ and $R^{18}$ are each further for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropoyl, 4-methoxybutyl, 4-ethoxybutyl, 4-butoxybutyl, 4-(2-ethylhexyloxy)butyl, 8-methoxyoctyl or 8-butoxyoctyl.

$R^{10}$, $R^{13}$ and $R^{14}$ are each further for example methoxy, ethoxy, propoxy, isopropoxy, butoxy, isobutoxy or sec-butoxy.

$R^{10}$ is further for example pentyloxy, isopentyloxy, neopentyloxy, hexyloxy, heptyloxy, octyloxy, 2-ethylhexyloxy, methylthio, ethylthio, propylthio, isopropylthio, butylthio, pentylthio, hexylthio, heptylthio, octylthio or 2-ethylhexylthio.

$R^1$, $R^2$ and $R^3$ are each further for example benzyl, 1- or 2-phenylethyl,

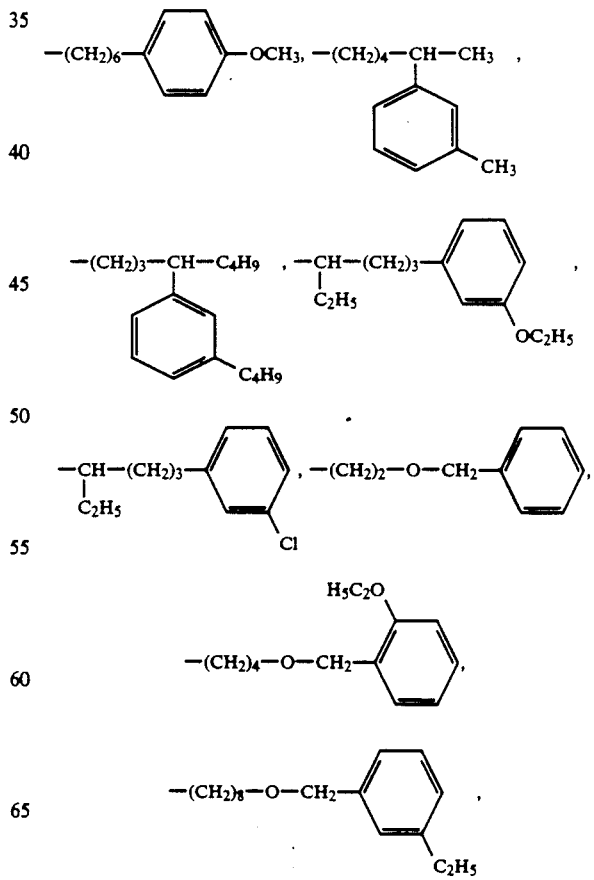

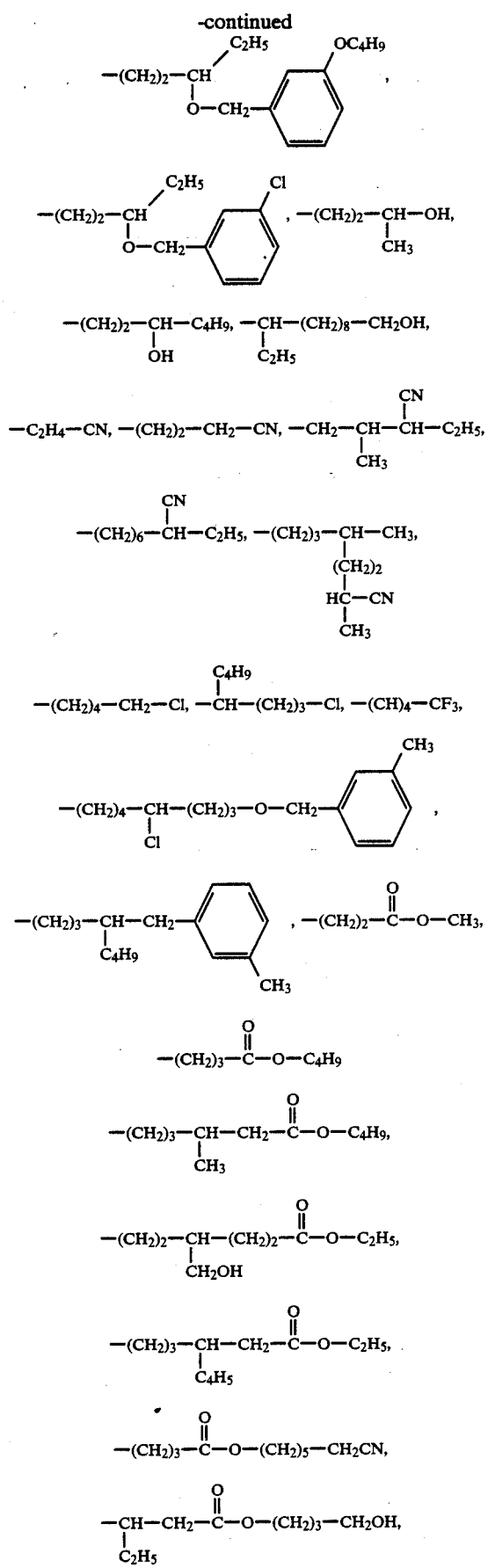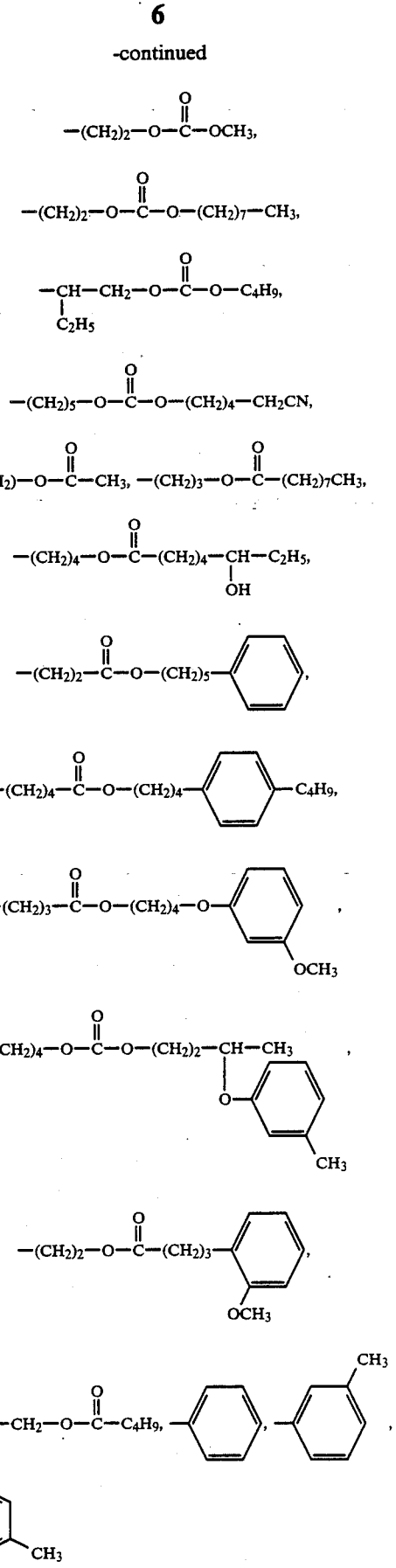

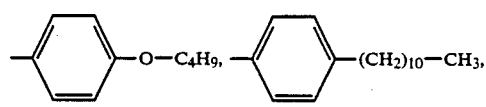
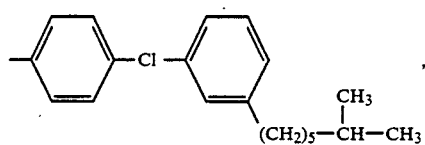
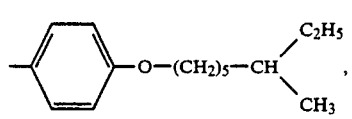
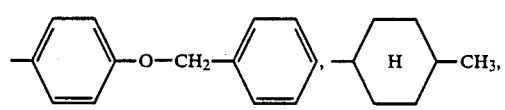
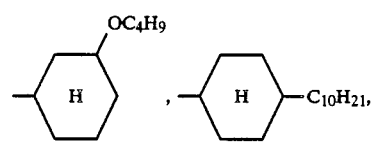
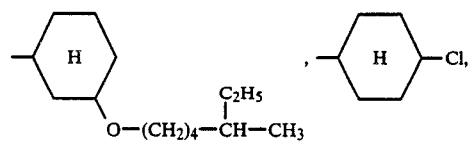
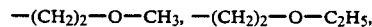
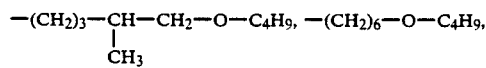
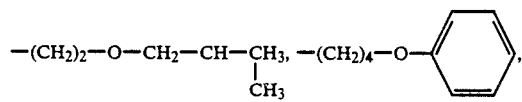
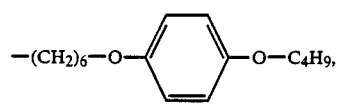
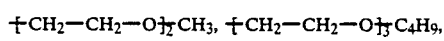
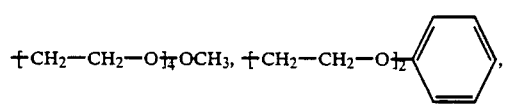
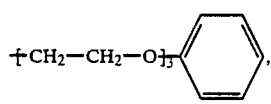
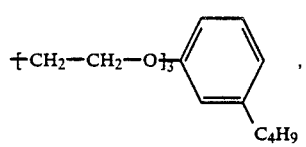

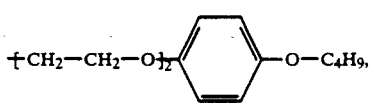
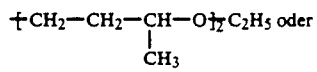
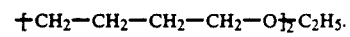

The radicals $R^7$, $R^8$, $R^9$, $R^{17}$ and $R^{18}$ are each subject to the corresponding exemplifying observations above.

Preference is given to using in the process according to the invention a substrate on which there are one or more azo dyes of the formula I where $R^1$, $R^2$ and $R^3$ are each independently of the others hydrogen, alkyl or alkoxyalkyl, each of which may have up to 15 carbon atoms and be substituted by phenyl, $C_1$-$C_4$-alkylphenyl, $C_1$-$C_4$-alkoxyphenyl or cyano, or a radical of the formula III $$[-(CH_2)_3-O]_p\,[-CH_2-CH_2-O]-R^5 \qquad (III),$$

where n is 1, 2, 3 or 4,
p is 0 or 1 and
$R^5$ is $C_1$-$C_4$-alkyl or phenyl, and $R^4$ is methyl.

Particular preference is given to the novel process using a substrate on which there are one or more azo dyes of the formula I where the radical D is derived from a diazo component conforming to the formula IVa, IVb, IVd or IVf where $R^7$, $R^8$ and $R^9$ are each independently of the others alkyl, alkoxyalkyl, alkoxycarbonylalkyl or alkanoyloxyalkyl, which may each have up to 10 carbon atoms, hydrogen, cyano, halogen, nitro or a radical of the formula $-CO-OR^{19}$, $-CO-NR^{19}R^{20}$, $-SO_2-R^{19}$, $-SO_2-OR^{19}$ or $SO_2-NR^{19}R^{20}$ where $R^{19}$ and $R^{20}$ are each independently of the other alkyl, alkoxyalkyl, alkoxycarbonylalkyl or alkanoyloxyalkyl, which may each have up to 10 carbon atoms, hydrogen or a radical of the formula $$[-CH_2-CH_2-O]_n-R^5 \qquad (II),$$

where $R^5$ and n are each as defined above.

Particular preference is further given to the novel process using a substrate in which there are one or more azo dyes of the formula I where the radical D is derived from a diazo component conforming to the formula IVc where $R^{10}$ is hydrogen, chlorine, $C_1$-$C_8$-alkyl, unsubstituted $C_1$-$C_4$-alkyl- or $C_1$-$C_4$-alkoxy-substituted phenyl or benzyl, $R^{11}$ is cyano or a radical of the formula $-CO-OR^{19}$ or $-CO-NR^{19}R^{20}$ where $R^{19}$ and $R^{20}$ are each as defined above, and $R^{12}$ is a radical of the formula

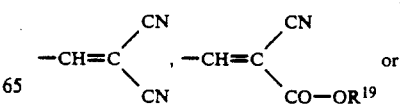

-continued

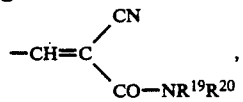

where $R^{19}$ and $R^{20}$ are each as defined above.

Preference is further given to the novel process using a substrate on which there are one or more azo dyes of the formula I where the radical D is derived from a diazo component conforming to the formula IVe where $R^{10}$ is hydrogen, chlorine, $C_1$-$C_8$-alkyl, unsubstituted or $C_1$-$C_4$-alkyl- or $C_1$-$C_4$-alkkoxy-substituted phenyl or benzyl and $R^{12}$ is cyano, nitro, formyl or a radical of the formula —CO—$OR^{19}$ where $R^{19}$ is as defined above.

Preference is further given to the novel process using a substrate on which there are one or more azo dyes of the formula I where the radical D is derived from a diazo component conforming to the formual IVg where $R^{10}$ is $C_1$-$C_8$-alkyl, $C_1$-$C_8$-alkoxy, alkoxyalkyl, of up to 8 carbon atoms, unsubstituted or $C_1$-$C_4$-alkyl- or $C_1$-$C_4$-alkoxy-substituted phneyl, benzyl or benzyloxy and $R^{11}$ is cyano, nitro or a radical of the formula —CO—$OR^{19}$ where $R^{19}$ is as defined above.

Preference is furter given to the novel process using a substrate on which there are one or more azo dyes of the formula I where the radical D is derived from a diazo component conforming to the formula IVc where $R^{10}$ is hydrogen, chlorine, $C_1$-$C_8$-alkyl, $C_1$-$C_8$-alkoxy, alkoxyalkyl of up to 8 carbon atoms, unsubstituted or $C_1$-$C_4$-alkyl- or $C_1$-$C_4$-alkoxy-substituted phneyl, benzyl or a radical of the formula —CO—$OR^{19}$ where $R^{19}$ is as defined above, $R^{11}$ is cyano or a radical of the formula —CO—$OR^{19}$ where $R^{19}$ is as defined above, and $R^{12}$ is cyano, nitro, formyl or a radical of the formula —CO—$OR^{19}$ where $R^{19}$ is as defined above.

Particularly good results are obtained on using a substrate on which there are one or more azo dyes of the formula I where the radical D is derived from a diazo component conforming to the formula IVa, IVb, IVc, IVd, IVe, IVf or IVg where $R^{19}$ and (if present) $R^{20}$ are each hydrogen or $C_1$-$C_5$-alkyl.

Particularly favorable results are further obtained on using a substrate on which there are one or more azo dyes of the formula I where the radical D is derived from a diazo component conforming to the formula V

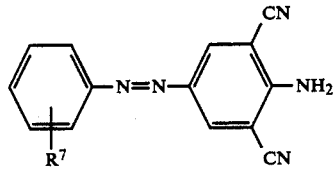

where $R^7$ is as defined above.

The dyes of the formula I are known per se or can be obtained by methods known per se.

Compared with the dyes used in existing processes, the dyes transferred in the process according to the invention are notable in general for improved migration properties in the receiving medium at room temperature, more ready thermal transferability, higher photochemical stability, easier industrial accessibility, better resistance to moisture and chemical substances, higher color strength, better solubility, higher purity of hue and in particular by substantially higher light fastness.

It is further surprising that the dyes of the formula I are readily transferable despite their relatively high molecular weight.

To prepare the dye substrate required for the novel process, the dyes are incorporated in a suitable organic solvent, for example chlorobenzene, isobutanol, methyl ethyl ketone, methylene chloride, toluene, tetrahydrofuran or a mixture thereof, with one or more binders with or without assistants to give a printing ink. This ink preferably contains the dye in a molecularly dispersed, ie. dissolved, form. The printing ink is applied to the inert substrate by knife coating and dried in air. Suitable binders are all resins or polymer materials which are soluble in organic solvents and are capable of holding the dye on the inert substrate in an abrasion-resistant bond. Preference is given to binders which, after the printing ink has dried in air, hold the dye in a clear, transparent film without visible crystallization of the dye.

Examples of such binders are cellulose derivatives, for example methylcellulose, ethylcellulose, ethylhydroxyethylcellulose, hydroxypropylcellulose, cellulose acetate or cellulose acetobutyrate, starch, alginates, alkyd resins, vinyl resins, polyvinyl alcohol, polyvinyl acetate, polyvinyl butyrate or polyvinylpyrrolidones. Other possibilities as binders are polymers and copolymers of acrylates or derivatives thereof, such as polyacrylic acid, polymethyl methacrylate or styrene/acrylate copolymers, polyester resins, polyamide resins, polyurethane resins or natural CH resins, such as gum arabic. Further suitable binders are described in DE-A-3,524,519.

Preferred binders are ethylcellulose and ethylhydroxyethylcellulose.

The ratio of binder to dye preferably varies from 5:1 to 1:1.

Possible assistants are release agents as described in EP-A-227,092, EP-A-192,435 and the patent applications cited therein and also particularly organic additives which stop the transfer dye from crystallizing in the course of storage or heating of the inked ribbon, for example cholesterol or vanillin.

Inert substrates are for example tissue, blotting or parchment paper or plastics films of high heat stability, for example uncoated or metal-coated polyester, polyamide or polyimide. The inert substrate may additionally be coated on the side facing the thermal printing head with a lubricant, or slipping, layer in order to prevent adhesion of the thermal printing head to the substrate material. Suitable lubricants are described for example in EP-A-216,483 and EP-A-277,095. The thickness of the dye substrate is in general from 3 to 30 μm, preferably from 5 to 10 μm.

Suitable dye receiver layers are basically all temperature stable plastics layers having an affinity for the dyes to be transferred whose glass transition temperature should- preferably be in the temperature range 50° C. <Tg <100° C. Examples are modified polycarbonates or polyesters. Suitable recipes for the receiver layer composition are described in detail for example in EP-A-227,094, EP-A-133,012, EP-A-133,011, EP-A-111,004, JP-A-199,997/1986, JP-A-283,595/1986, JP-A-237,694/1986 and JP-A-127,392/1986.

Transfer is effected by means of a thermal printing head which must be heatable to a temperature ≧300° C. for the dye transfer to take place within the time interval t: $0 < t < 15$ msec. On heating, the dye migrates out of the transfer sheet and diffuses into the surface coating of the receiving medium.

Details of the preparation may be found in the Examples, where percentages are by weight, unless otherwise stated.

Transfer of dyes

To be able to test the transfer characteristics of the dyes in a quantitative and simple manner, the thermo-transfer was carried out with large hotplates instead of a thermal printing head, with the transfer temperature being varied within the range 70° C. $< T <$ 120° C. and the transfer time being set at 2 minutes.

(A) General recipe for coating the substrate with dye: X g of binder are dissolved at from 40° to 50° C. in 8 ml of 8:2 v/v toluene/ethanol. A solution of 0.25 g of dye (and any cholesterol as assistant) in 5 ml of tetrahydrofuran was added by stirring. The print paste thus obtained was smoothed down with an 80 μm knife on a sheet of polyester film (thickness: 6–10 μm) and dried with a hair dryer. (The weight ratio of dye:binder:assistant, from which the absolute amount of binder and assistant can be derived, is given for each case in the tables.)

(B) Testing of thermal transferability

The dyes used were tested in the following manner:

The polyester sheet donor containing the dye under test on the coated front was placed face down on commercial Hitachi Color Video Print Paper (receiver) and pressed down. Donor/receiver were then wrapped in aluminum foil and heated between two hotplates at different temperatures T (within the temperature range 70° C. $< T <$ 120° C.). The amount of dye diffusing into the bright plastics layer of the receiver is proportional to the optical density (=absorbance A). The latter was determined photometrically. If the logarithm of the absorbance A of the colored receiver papers measured within the temperature range from 80° to 110° C. is plotted against the corresponding reciprocal absolute-temperature, the result is a straight line whose slope gives the activation energy $\Delta E_T$ for the transfer experiment:

$$\Delta E_T = 2.3 \times R \times \frac{\Delta \log A}{\Delta \left[ \frac{1}{T} \right]}$$

To complete the characterization, the plots additionally reveal the temperature T*[° C.] at which the absorbance A of the dyed receiver papers attains the value 2.

The dyes mentioned in the Tables below were processed according to (A), and the resulting dye-coated substrates were tested in respect of their transfer characteristics by (B). The Tables list in each case the thermotransfer parameters T* and $\Delta E_T$, the absorption maximum of the dyes $\lambda_{max}$ (measured in methylene chloride), the binders used and the weight ratio of dye:binder:assistant.

The abbreviations have the following meanings: B =binder (EC=ethylcellulose, EHEC=ethylhydroxyethylcellulose, ethylcellulose, AC =cellulose acetobutyrate, MIX mixture of polyvinyl butyrate and ethylcellulose in a weight ratio of 2:1)

D =dye

Chol =cholesterol (assistant)

TABLE 1

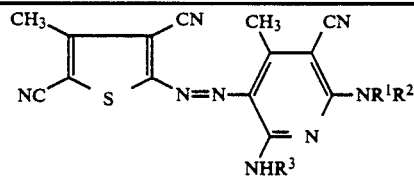

| Example No. | $R^1$ | $R^2$ | $R^3$ | $\lambda_{max}$ [nm] | B | Chol. | D:B:Chol. | T* [°C.] | $\Delta E_T \left[ \frac{kcal}{mol} \right]$ |
|---|---|---|---|---|---|---|---|---|---|
| 1 | $C_2H_5$ | $C_2H_5$ | $C_3C_6OC_2H_4OC_6H_5$ | 544 | EC | — | 1:4 | 106 | 17 |
| 2 | $C_2H_4OCH_3$ | $C_2H_4OCH_3$ | $C_3H_6OC_2H_4OC_6H_5$ | 543 | EC | — | 1:4 | 109 | 14 |
| 3 | $C_2H_5$ | $C_2H_5$ | $C_3H_6OCH_3$ | 544 | EHE | — | 1:4 | 105 | 12 |
| 4 | $C_2H_5$ | $C_2H_5$ | $C_3H_6OCH_3$ | 544 | AC | — | 1:4 | 110 | 16 |
| 5 | $C_2H_5$ | $C_2H_5$ | $C_3H_6OCH_3$ | | EC | — | 1:3 | 96 | 24 |
| 6 | $C_2H_4OCH_3$ | $C_2H_4OCH_3$ | $C_3H_6OC_2H_4OC_6H_5$ | 543 | EHEC | — | 1:4 | 109 | 13 |
| 7 | $C_2H_4OCH_3$ | $C_2H_4OCH_3$ | $C_3H_6OC_2H_4OC_6H_5$ | 543 | EC | + | 1:4:0.75 | 92 | 25 |
| 8 | $C_2H_4OCH_3$ | $C_2H_4OCH_3$ | $C_3H_6OC_2H_4OC_6H_5$ | 543 | EC | — | 1:2 | 91 | 24 |
| 9 | H | $C_3H_6OCH_3$ | $C_3H_6O(C_2H_4O)_2C_2H_5$ | 532 | EC | — | 1:4 | 113 | 21 |
| 10 | H | $C_3H_6O(C_2H_4O)_2CH_3$ | $C_6H_5$ | 547 | EC | + | 1:4:0.75 | 111 | 25 |
| 11 | H | $C_3H_6OCH_3$ | $C_3H_6O(C_2H_4O)_2CH_3$ | 533 | EC | + | 1:4:0.75 | 93 | 19 |
| 12 | H | $C_3H_6OCH_3$ | $C_3H_6O(C_2H_4O)_2CH_3$ | 533 | EHEC | + | 1:4:0.75 | 90 | 28 |
| 13 | H | $C_3H_6OCH_3$ | $C_3H_6OC_2H_4OC_4H_9$ | 534 | EC | + | 1:4:0.75 | 96 | 23 |
| 14 | H | $C_3H_6OCH_3$ | $C_3H_6OC_2H_4OC_4H_9$ | 534 | EHEC | + | 1:4:0.75 | 92 | 31 |
| 15 | H | $C_3H_6O(C_2H_4O)_2C_4H_9$ | $C_3H_6OCH_3$ | 535 | EC | — | 1:2 | 95 | 31 |
| 16 | H | $C_3H_6O(C_2H_4O)_2C_4H_9$ | $C_3H_6OCH_3$ | 535 | EC | — | 1:4 | 101 | 24 |
| 17 | H | $C_3H_6O(C_2H_4O)_2C_4H_9$ | $C_3H_6OCH_3$ | 535 | EC | + | 1:4:0.75 | 95 | 24 |
| 18 | H | $C_2H_4OC_4H_9$ | $C_2H_4OC_4H_9$ | 530 | EC | + | 1:4:0.75 | 102 | 21 |
| 19 | $C_2H_4OCH_3$ | $C_2H_4OCH_3$ | $C_3H_6$—$OCOCH_3$ | 528 | EC | + | 1:4 | 130 | 20 |
| 20 | H | $C_3H_6OC_2H_4OC_4H_9$ | $C_2H_5$ | 530 | EC | + | 1:5:0.75 | | |
| 21 | $C_2H_5$ | $C_2H_5$ | $C_2H_4OCH_3$ | 541 | EC | + | 1:4:0.75 | 97 | 25 |
| 22 | H | $C_3H_6OC_2H_4OC_4H_9$ | $C_3H_6OCH_3$ | 534 | EC | + | 1:4:0.5 | 88 | 20 |
| 23 | H | $C_3H_6OC_2H_4OC_4H_9$ | $C_3H_6OCH_3$ | 534 | EC | + | 1:4:0.75 | 88 | 32 |
| 24 | H | $C_3H_6OC_2H_4OC_4H_9$ | $C_3H_6OCH_3$ | 534 | EC | + | 1:4:1.0 | 85 | 25 |
| 25 | H | $C_3H_6OC_2H_4OC_4H_9$ | $C_3H_6OCH_3$ | 534 | EC | — | 1:4 | 94 | 20 |
| 26 | H | $C_3H_6O(C_2H_4O)_2C_4H_9$ | $C_5H_{10}CN$ | 532 | EC | — | ·1:4 | 100 | 23 |
| 27 | H | $C_4H_9$ | $C_3H_6OC_2H_4OC_6H_5$ | 534 | EC | — | 1:4 | 127 | 11 |
| 28 | $C_2H_5$ | $C_3H_6OCH_3$ | $C_3H_6OC_2H_4OC_6H_5$ | 545 | MIX | — | 1:4 | 119 | 18 |

TABLE 1-continued

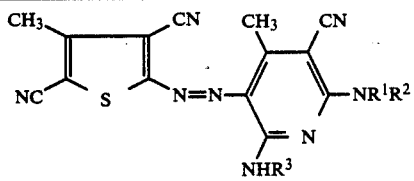

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 29 | C₂H₄OCH₃ | C₂H₄OCH₃ | C₃H₆OCOCH₃ | 541 | MIX | — | 1:4 | 107 | 9.0 |

TABLE 2

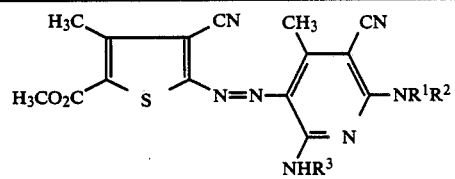

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 30 | C₂H₄OCH₃ | C₂H₄OCH₃ | C(CH₃)₂C₂H₅ | 534 | EC | + | 1:4:0.75 | 100 | 32 |
| 31 | C₂H₅ | C₂H₅ | C₂H₄OCH₃ | 534 | EC | + | 1:4:0.75 | 104 | 26 |
| 32 | H | CH—C₃H₆CH(CH₃)₂ \| CH₃ | CH—C₃H₆CH(CH₃)₂ \| CH₃ | 530 | EC | + | 1:4:0.75 | 101 | 29 |
| 33 | C₂H₅ | C₂H₅ | (CH₂)₃OCH₃ | 536 | EC | + | 1:4:0.75 | 97 | 27 |
| 34 | C₂H₄OCH₃ | C₂H₄OCH₃ | C₃H₆OCOCH₃ | 534 | EC | + | 1:4:0.75 | 94 | 23 |
| 35 | C₂H₄OCH₃ | C₂H₄OCH₃ | C₃H₆OC₂H₄OC₆H₅ | 534 | EC | — | 1:4 | 110 | 26 |
| 36 | C₂H₄OCH₃ | C₂H₄OCH₃ | C₃H₆OC₂H₄OC₆H₅ | 534 | EHE | — | 1:4 | 104 | 17 |
| 37 | H | C₃H₆OCH₃ | C₃H₆OC₂H₄OC₄H₉ | 532 | EC | — | 1:4 | 115 | 19 |
| 38 | H | C₃H₆OCH₃ | C₃H₆O(C₂H₄O)₂C₄H₉ | 532 | EC | — | 1:4 | 110 | 25 |
| 39 | H | C₃H₆OC₂H₄OC₆H₅ | H | 515 | EC | + | 1:4:0.75 | 115 | 21 |
| 40 | H | C₂H₆OC₂H₄OC₂H₅ | H | 514 | EC | + | 1:4:0.75 | 109 | 31 |
| 41 | H | C₃H₆OC₄H₈OC₄H₉ | H | 515 | EC | + | 1:4:0.75 | 106 | 32 |
| 42 | H | C₃H₆OC₂H₄OCH₃ | H | 515 | EC | + | 1:4:0.75 | 108 | 30 |
| 43 | H | C₃H₆OC₄H₈OC₂H₅ | H | 515 | EC | + | 1:4:0.75 | 106 | 30 |
| 44 | C₂H₅ | C₂H₅ | C₃H₆OC₂H₄OC₆H₅ | 537 | EC | + | 1:4:0.75 | 98 | 21 |
| 45 | C₂H₄OCH₃ | C₂H₄OCH₃ | C₃H₆OC₂H₅ | 534 | EC | — | 1:4 | 113 | 24 |
| 46 | H | C₃H₆O(C₂H₄O)₂C₄H₉ | H | 513 | EC | — | 1:4 | 113 | 27. |
| 47 | C₂H₅ | C₂H₅ | C₃H₆OC₂H₄OC₆H₅ | 536 | EC | — | 1:4 | 112 | 19 |
| 48 | C₂H₅ | C₃H₆OCH₃ | C₃H₆OCH₃ | 537 | MIX | — | 1:4 | 105 | 13 |
| 49 | C₂H₅ | C₃H₆OCH₃ | C₃H₆OC₂H₄OC₆H₅ | 537 | EC | — | 1:4 | 98 | 20 |

TABLE 3

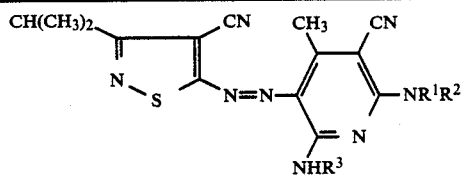

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 50 | C₂H₅ | C₂H₅ | C₃H₆OC₂H₅ | 522 | EC | + | 1:4:0.75 | 92 | 28 |

TABLE 4

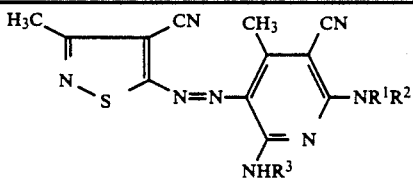

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 51 | C₂H₅ | C₂H₅ | C₃H₆OCH₃ | 522 | EC | + | 1:4:0.75 | 84 | 21 |
| 52 | H | C₆H₅ | C₃H₆OC₂H₄OCH₃ | 524 | EC | + | 1:4:0.75 | 100 | 32 |
| 53 | H | (o-methoxyphenyl) | C₃H₆OC₂H₄OCH₃ | 532 | EC | + | 1:4:0.75 | 93 | 22 |
| 54 | H | C₃H₆OC₄H₈OC₂H₅ | H | 494 | EC | + | 1:4:0.75 | 90 | 21 |

TABLE 5

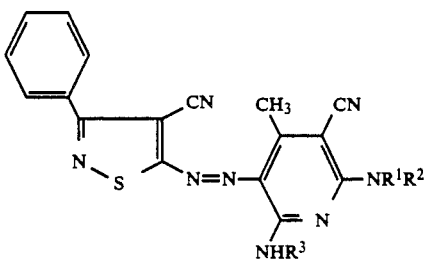

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 55 | C₂H₅ | C₂H₅ | C₃H₆OC₂H₄OC₆H₅ | 527 | EC | + | 1:2:0.75 | 100 | 30 |
| 56 | C₂H₄OCH₃ | C₂H₄OCH₃ | C₃H₆OC₂H₅ | 526 | EC | + | 1:2:0.75 | 91 | 29 |
| 57 | H | C₆H₅ | C₃H₆O(C₂H₄O)₂CH₃ | 527 | EC | + | 1:4:0.75 | 116 | 24 |
| 58 | C₂H₄OCH₃ | C₂H₄OCH₃ | 4-tert-butylcyclohexyl | 527 | EC | + | 1:4:0.75 | 108 | 27 |
| 59 | H | C₃H₆O(C₂H₄O)₂CH₃ | C₆H₅ | 528 | EC | − | 1:4 | 127 | 20 |

TABLE 6

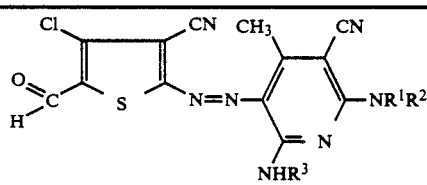

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 60 | H | C₆H₅ | C₃H₆O(C₂H₄O)₂CH₃ | 557 | EC | + | 1:2:0.75 | 107 | 22 |
| 61 | H | C₃H₆OCHCH₃CH₂OCH₃ | H | 537 | EC | + | 1:4:0.75 | 101 | 30 |
| 62 | H | C₃H₆OC₂H₄OC₂H₅ | H | 534 | EC | + | 1:4:0.75 | 95 | 23 |
| 63 | H | C₃H₆OC₂H₄OC₄H₉ | H | 537 | EC | + | 1:4:0.75 | 107 | 29 |
| 64 | C₃H₇ | C₃H₇ | C₃H₆OC₂H₄OC₆H₅ | 565 | EC | − | 1:4 | 106 | 20 |
| 65 | H | CH₂CH₂OCOCH₃ | C₃H₆OC₂H₄OC₆H₅ | 547 | MIX | − | 1:4 | 116 | 14 |

TABLE 7

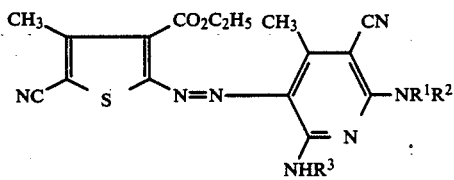

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 66 | H | $C_3H_6OC_4H_8OC_4H_9$ | H | 515 | EC | + | 1:4:0.75 | 102 | 24 |
| 67 | H | $C_3H_6OC_2H_4OC_4H_9$ | H | 514 | EC | + | 1:4:0.75 | 100 | 32 |

TABLE 8

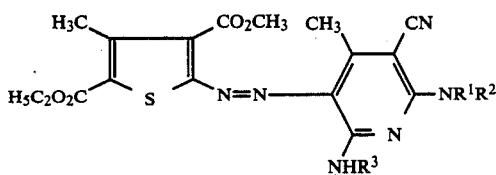

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 68 | H | $C_3H_6OC_2H_4OC_4H_9$ | $C_2H_5$ | 519 | EC | + | 1:4:0.75 | 97 | 26 |
| 69 | H | $C_3H_6OC_2H_4OC_4H_9$ | $C_3H_6OC_4H_8OC_4H_9$ | 526 | EC | + | 1:4:0.75 | 96 | 24 |

TABLE 9

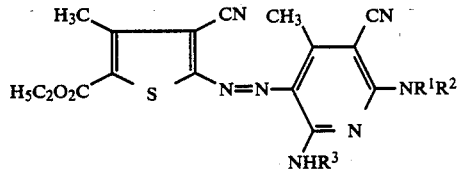

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 70 | $C_2H_4OCH_3$ | $C_2H_4OCH_3$ | $C_3H_6OCH_3$ | 534 | EC | − | 1:4 | 112 | 24 |
| 71 | $C_2H_4OCH_3$ | $C_2H_4OCH_3$ | $C_3H_6OC_2H_4OC_6H_5$ | 534 | EC | − | 1:4 | 112 | 24 |

TABLE 10

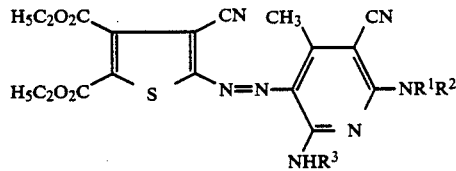

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 72 | H | $C_3H_6OC_2H_4OC_2H_5$ | H | 520 | EC | + | 1:4:0.75 | 98 | 20 |
| 73 | $C_2H_5$ | $C_2H_5$ | $C_3H_6OC_4H_8OC_4H_9$ | 545 | EC | + | 1:4:0.75 | 96 | 25 |

TABLE 11

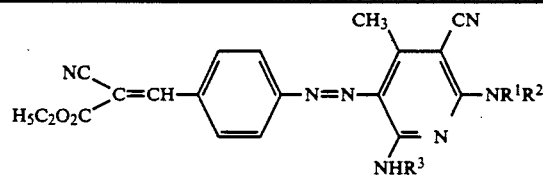

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 74 | H | $CH(C_2H_5)CH_2OCH_3$ | $CH(C_2H_5)CH_2OCH_3$ | 502 | EC | + | 1:4:0.75 | 95 | 22 |
| 75 | H | $CH(C_2H_5)CH_2OCH_3$ | $CH(CH_3)_2$ | 503 | EC | + | 1:4:0.75 | 100 | 24 |

TABLE 12

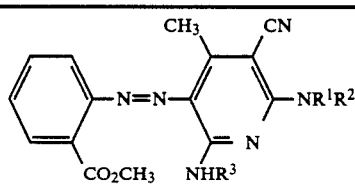

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 76 | H | $C_6H_5$ | $C_3H_6OC_2H_4OCH_3$ | 442 | EC | − | 1:4 | 107 | 26 |

TABLE 13

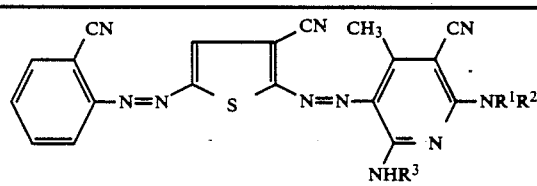

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 77 | $C_2H_4OCH_3$ | $C_2H_4OCH_3$ | $C_3H_6OC_2H_5$ | 619 | EC | + | 1:4:0.75 | 100 | 29 |
| 78 | $C_2H_4OCH_3$ | $C_2H_4OCH_3$ | $C_3H_6OCH_3$ | 619 | EC | + | 1:4:0.75 | 110 | 26 |
| 79 | $C_2H_4OC_2H_4OC_2H_5$ | $C_2H_4OC_2H_4OC_2H_5$ | $C_3H_6OCH_3$ | 618 | EC | − | 1:4 | 123 | 17 |

TABLE 14

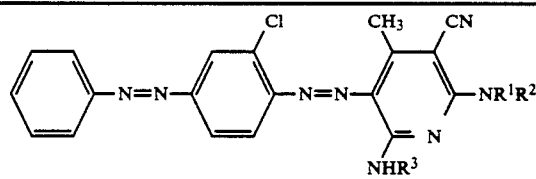

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 80 | $C_2H_5$ | $C_2H_5$ | $C_2H_4OCH_3$ | 508 | EC | + | 1:4:0.75 | 94 | 31 |
| 81 | $C_2H_5$ | $C_2H_5$ | $C_3H_6OC_2H_5$ | 515 | EC | − | 1:2 | 86 | 28 |
| 82 | $C_2H_5$ | $C_2H_5$ | $C_3H_6OC_2H_5$ | 515 | EC | + | 1:4:0.75 | 93 | 30 |
| 83 | $C_2H_4OCH_3$ | $C_2H_4OCH_3$ | $C_3H_6OCH_3$ | 508 | EC | − | 1:2 | 89 | 17 |
| 84 | $C_2H_4OCH_3$ | $C_2H_4OCH_3$ | $C_3H_6OCH_3$ | 508 | EC | + | 1:4:0.75 | 95 | 25 |
| 85 | H | $C_2H_4OC_4H_9$ | $C_2H_4OC_4H_9$ | 505 | EC | − | 1:4 | 109 | 30 |
| 86 | H | $C_3H_6OC_2H_4OC_4H_9$ | $C_3H_6OCH_3$ | 504 | EC | − | 1:4 | 103 | 26 |
| 87 | H | $C_3H_6O(C_2H_4O)_2C_4H_9$ | $C_3H_6OCH_3$ | 497 | EC | − | 1:4 | 105 | 30 |

TABLE 15

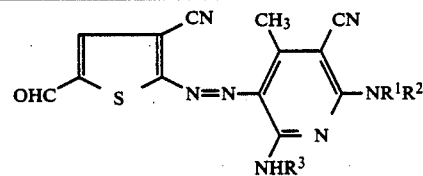

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 88 | $C_2H_5$ | $C_2H_5$ | $C_3H_6O_2H_4OC_6H_5$ | 548 | EC | — | 1:4 | 123 | 15 |

TABLE 16

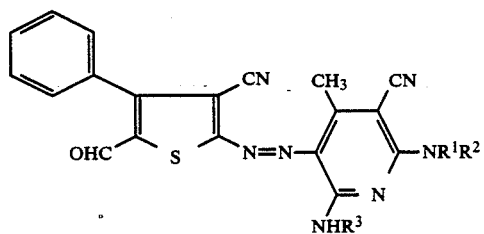

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 89 | $C_2H_4OCH_3$ | $C_2H_4OCH_3$ | $C_3H_6OCH_3$ | 555 | EC | — | 1:4 | 110 | 23 |
| 90 | $C_2H_4OCH_3$ | $C_2H_4OCH_3$ | $C_3H_6OC_2H_5$ | 558 | EC | — | 1:4 | 111 | 18 |

TABLE 17

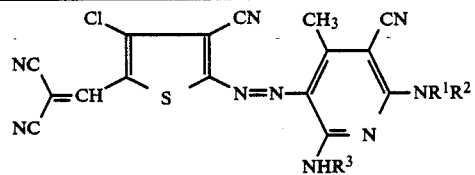

| Example No. | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|
| 91 | $C_2H_5$ | $C_2H_5$ | $C_3H_6OC_2H_5$ | 614 | EC | — | 1:4 | 104 | 35 |
| 92 | $C_2H_5$ | $C_2H_5$ | $C_3H_6OC_2H_4OC_6H_5$ | 615 | EC | — | 1:4 | 100 | 25 |
| 93 | $C_2H_5$ | $C_2H_5$ | $(CH_2)_4OC_4H_9$ | 614 | EC | — | 1:4 | 108 | 24 |
| 94 | $C_3H_7$ | $C_3H_7$ | $C_3H_6OC_2H_4OC_6H_5$ | 618 | MIX | — | 1:4 | 118 | 13 |
| 95 | $C_3H_7$ | $C_3H_7$ | $C_3H_6OC_2H_4OC_6H_5$ | 618 | EC | — | 1:4 | 100 | 30 |

TABLE 18

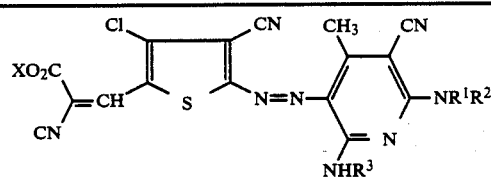

| Example No. | X | $R^1$ | $R^2$ | $R^3$ | λmax [nm] | B | Chol. | D:B:Chol. | T* [°C.] | $\Delta E_T \left[\frac{kcal}{mol}\right]$ |
|---|---|---|---|---|---|---|---|---|---|---|
| 96 | $C_4H_9$ | $C_2H_5$ | $C_2H_5$ | $C_3H_6OC_2H_5$ | 598 | EC | — | 1:4 | 117 | 28 |
| 97 | $C_4H_9$ | $C_3H_7$ | $C_3H_7$ | $C_3H_6OC_2H_4OC_6H_5$ | 601 | EC | — | 1:4 | 127 | 16 |

TABLE 19

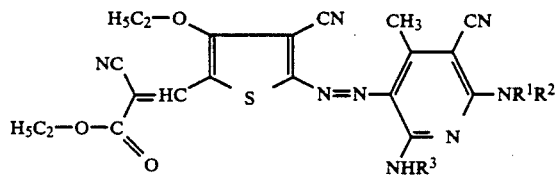

| Example No. | R[1] | R[2] | R[3] | λmax [nm] | B | Chol. | D:B:Chol. | T* [A = 1] [°C.] | $\Delta E_T \left[\frac{kcal}{mol}\right]$ |
|---|---|---|---|---|---|---|---|---|---|
| 98 | C2H4OCH3 | C2H4OCH3 | C3H6OH3 | 601 | EC | — | 1:4 | 127 | 16 |
| 99 | C2H4OCH3 | C2H4OCH3 | C3H6OC2H4OC6H5 | 601 | EC | — | 1:4 | 129 | 15 |
| 100 | C2H4OCH3 | C2H4OCH3 | C3H6OC2H4OC6H5 | 607 | EC | — | 1:4 | 124 | 15 |
| 101 | C2H4OCH3 | C2H4OCH3 | C4H9 | 605 | EC | + | 1:4:0,75 | 98 | 21 |

TABLE 20

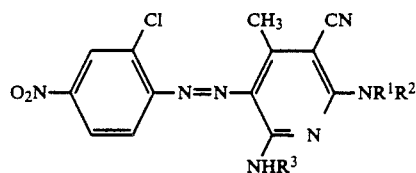

| Example No. | R[1] | R[2] | R[3] | λmax [nm] | B | Chol. | D:B:Chol. | T* [°C.] | $\Delta E_T \left[\frac{kcal}{mol}\right]$ |
|---|---|---|---|---|---|---|---|---|---|
| 102 | C2H5 | C2H5 | C3H6OCH3 | 517 | EC | + | 1:4:0.75 | 84 | 15 |
| 103 | C2H5 | C2H5 | C3H6OC2H4OC6H5 | 518 | EC | + | 1:4:0.75 | 87 | 20 |
| 104 | C2H4OCH3 | C2H4OCH3 | C2H4OCH3 | 504 | EC | + | 1:4:0.75 | 97 | 22 |
| 105 | H | C2H4OCONHC4H9 | C2H5 | 501 | EC | + | 1:4:0.75 | 111 | 24 |

TABLE 21

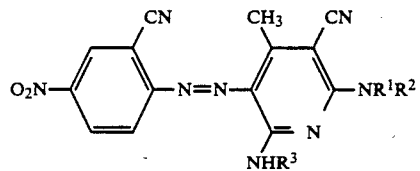

| Example No. | R[1] | R[2] | R[3] | λmax [nm] | B | Chol. | D:B:Chol. | T* [°C.] | $\Delta E_T \left[\frac{kcal}{mol}\right]$ |
|---|---|---|---|---|---|---|---|---|---|
| 106 | C2H5 | C2H5 | C3H6OC2H4OC6H5 | 531 | EC | — | 1:4 | 107 | 16 |

TABLE 22

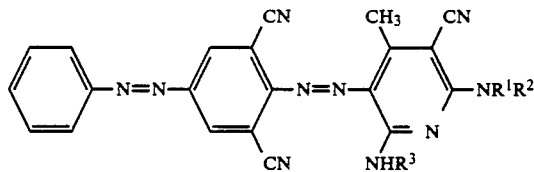

| Example No. | R[1] | R[2] | R[3] | λmax [nm] | B | Chol. | D:B:Chol. | T* [°C.] | $\Delta E_T \left[\frac{kcal}{mol}\right]$ |
|---|---|---|---|---|---|---|---|---|---|
| 107 | C2H5 | C2H5 | C3H6OCH3 | 555 | EC | — | 1:4 | 118 | 16 |

TABLE 23

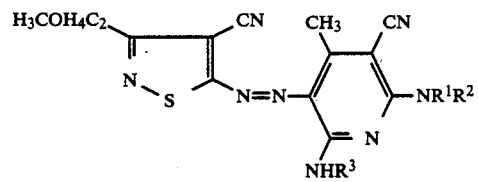

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 108 | H | 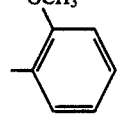 OCH₃ | C₃H₆OC₂H₄OCH₃ | 532 | EC | — | 1:4 | 102 | 15 |

TABLE 24

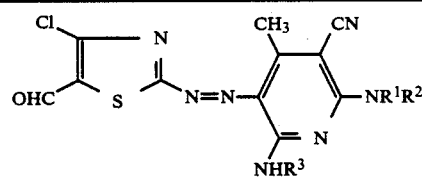

| Example No. | R¹ | R² | R³ | λmax [nm] | B | Chol. | D:B:Chol. | T* [°C.] | $\Delta E_T \left[\frac{kcal}{mol}\right]$ |
|---|---|---|---|---|---|---|---|---|---|
| 109 | C₂H₄OCH₃ | C₂H₄OCH₃ | C₃H₆OC₂H₄OC₆H₅ | 535 | MIX | — | 1:4 | 87 | 21 |
| 110 | C₂H₅ | C₃H₆OCH₃ | C₃H₆OC₂H₄OC₆H₅ | 537 | MIX | — | 1:4 | 91 | 19 |

TABLE 25

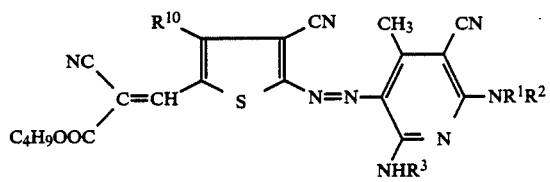

| Example No. | R¹ | R² | R³ | R¹⁰ | λmax [nm] | B | Chol. | D:B:Chol. | T* [°C.] | $\Delta E_T \left[\frac{kcal}{mol}\right]$ |
|---|---|---|---|---|---|---|---|---|---|---|
| 111 | C₂H₅ | C₂H₅ | C₃H₆OC₂H₄OC₆H₅ | H | 595 | MIX | — | 1:4 | 118 | 16 |
| 112 | C₂H₅ | C₂H₅ | C₃H₆OC₂H₄OC₆H₅ | CH₃ | 598 | MIX | — | 1:4 | 122 | 14 |

TABLE 26

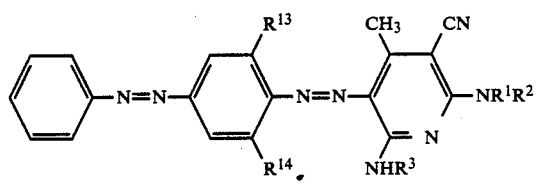

| Example No. | R¹ | R² | R³ | R¹³ | R¹⁴ | λmax [nm] | B | Chol. | D:B:Chol. | T* [°C.] | $\Delta E_T \left[\frac{kcal}{mol}\right]$ |
|---|---|---|---|---|---|---|---|---|---|---|---|
| 123 | H | C₃H₆OC₂H₄OCH₃ | C₆H₅ | H | H | 495 | EC | + | 1:4:0.75 | 113 | 32 |

TABLE 27

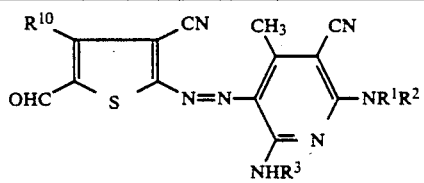

| Example No. | R¹ | R² | R³ | R¹⁰ | λmax [nm] | B | Chol. | D:B:Chol. | T* [°C] | $\Delta E_T \left[\frac{kcal}{mol}\right]$ |
|---|---|---|---|---|---|---|---|---|---|---|
| 114 | H | $C_3H_6OC_2H_4OCH_3$ | $C_3H_6OC_2H_4OC_6H_5$ | $CH_3$ | 540 | MIX | — | 1:4 | 109 | 14 |

TABLE 28

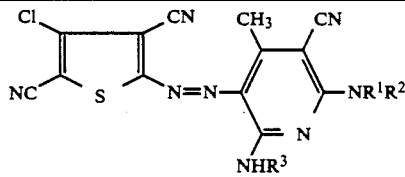

| Example No. | R¹ | R² | R³ | λmax [nm] | B | Chol. | D:B:Chol. | T* [°C] | $\Delta E_T \left[\frac{kcal}{mol}\right]$ |
|---|---|---|---|---|---|---|---|---|---|
| 115 | H | $C_3H_6OCH(CH_3)_2$ | $C_3H_6OC_2H_4OC_6H_5$ | 544 | MIX | — | 1:4 | 107 | 20 |
| 116 | H | $C_3H_6OC_2H_4OCH_3$ | $C_3H_6OC_2H_4OC_6H_5$ | 544 | MIX | — | 1:4 | 106 | 17 |

TABLE 29

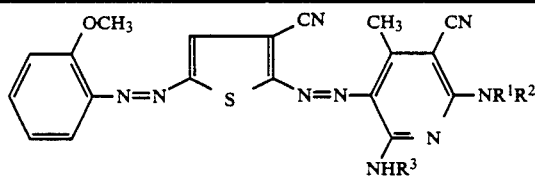

| Example No. | R¹ | R² | R³ | λmax [nm] | B | Chol. | D:B:Chol. | T* [°C] | $\Delta E_T \left[\frac{kcal}{mol}\right]$ |
|---|---|---|---|---|---|---|---|---|---|
| 117 | $C_2H_4OCH_3$ | $C_2H_4OCH_3$ | $C_3H_6OC_2H_5$ | 601 | EC | — | 1:4 | 126 | 17 |

TABLE 30

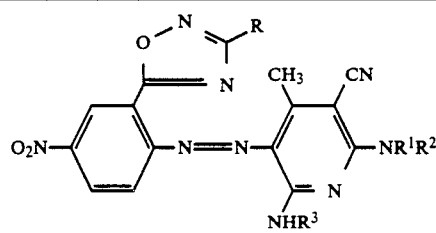

| Example No. | R¹ | R² | R³ | R | λmax [nm] | B | Chol. | D:B:Chol. | T* [°C] | $\Delta E_T \left[\frac{kcal}{mol}\right]$ |
|---|---|---|---|---|---|---|---|---|---|---|
| 118 | H | $C_3H_6OCH_3$ | $C_3H_6OCH_3$ | $C_2H_4OC_2H_4OC_6H_5$ | 511 | EC | — | 1:4 | 121 | 17 |
| 119 | H | $C_2H_4OCH_3$ | $C_2H_4OCH_3$ | $C_2H_4OC_2H_4OC_6H_5$ | 510 | EC | — | 1:4 | 108 | 24 |
| 120 | H | $C_3H_6OCH_3$ | $C_3H_6OCH_3$ | $C_2H_4OC_3H_7$ | 520 | EC | — | 1:4 | 113 | 24 |
| 121 | H | $C_3H_6OCH_3$ | $C_3H_6OCH_3$ | $C_2H_4OCH_2C_6H_5$ | 521 | EC | + | 1:4:0.75 | 102 | 29 |
| 122 | H | $C_3H_6OCH_3$ | $C_3H_6OCH_3$ | $CH_2OCH_3$ | 523 | EC | + | 1:4:0.75 | 121 | 15 |

We claim:

1. A process for transferring azo dyes from a substrate to a plastic-coated paper by diffusion with the aid of a thermal printing head, which comprises using a substrate on which there are one or more azo dyes of the formula I

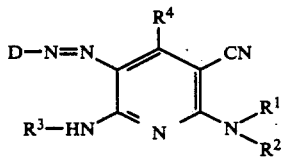

where
R$^1$, R$^2$ and R$^3$ are identical or different and each is independently of the other (a) alkyl, alkoxyalkyl, alkanoyloxyalkyl, alkoxycarbonyloxyalkyl or alkoxycarbonylalkyl, each having up to 20 carbon atoms and being unsubstituted or substituted by phenyl, C$_1$-C$_4$-alkylphenyl, C$_1$-C$_4$-alkoxyphenyl, halophenyl, benzyloxy, C$_1$-C$_4$-alkylbenzyloxy, C$_1$-C$_4$-alkoxybenzyloxy, halobenzyloxy, halogen, hydroxyl or cyano, (b) hydrogen, (c) unsubstituted or C$_1$-C$_{15}$-alkyl-, C$_1$-C$_{15}$-alkoxy-, halogen- or benzyloxy-substituted phenyl, (d) unsubstituted or C$_1$-C$_{15}$-alkyl-, C$_1$-C$_{15}$-alkoxy-, halogen- or benzyloxy-substituted benzyl or (e) a radical of the formula II $(-Y-O)_m-R^5$      (II)

where
Y is C$_2$-C$_6$-alkylene,
m is 1, 2, 3, 4, 5 and 6 and
R$^5$ is C$_1$-C$_4$-alkyl or unsubstituted or C$_1$-C$_4$-alkyl- or C$_1$-C$_4$-alkoxy-substituted phenyl,
R$^4$ is C$_1$-C$_4$-alkyl and
D is the radical of a diazo component of the formula

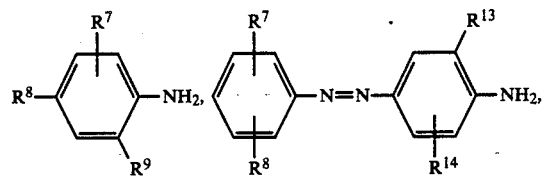

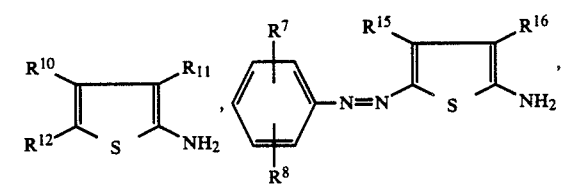

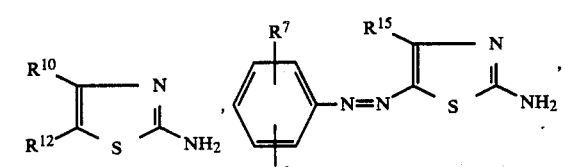

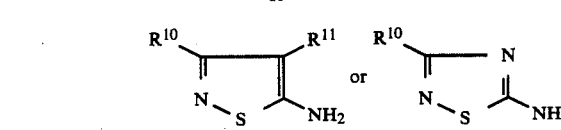

where
R$^7$, R$^8$ and R$^9$ are identical or different and each is independently or the other (a) alkyl, alkoxyalkyl, alkoxycarbonylalkyl or alkanoyloxyalkyl, each having up to 12 carbon atoms, (b) hydrogen, (d) cyano, (d) halogen, (e) nitro, or (f) a radical of the formula $(-Y-O)_m-R^5$ where Y, R$^5$ and m are each as defined above, or Y or R$^5$ are a radical of the formula —CO—OR$^{17}$, —CO—NR$^{17}$R$^{18}$, —SO$_2$—R$^{17}$, —SO$_2$—OR$^{17}$ or —SO$_2$—NR$^{17}$R$^{18}$, where R$^{17}$ are R$^{18}$ are identical or different and each is independently of the other (a) alkyl, alkoxyalkyl, alkoxycarbonylalkyl or alkanoyloxyalkyl, each having up to 12 carbon atoms, (b) hydrogen or (c) a radical of the formula $(-Y-O)_m-R^5$ where Y, R$^5$ and m are each as defined above,
R$^{10}$ is hydrogen, chlorine, cyano, C$_1$-C$_8$-alkyl, C$_1$-C$_8$-alkoxy, C$_1$-C$_8$-alkylthio, alkoxyalkyl of up to 8 carbon atoms, phenyl unsubstituted or substituted by C$_1$-C$_4$-alkyl, C$_1$-C$_4$-alkoxy or benzyloxy, benzyl, benzyloxy or a radical of the formula —CO—OR$^{17}$ or —CO—NR$^{17}$R$^{18}$ where R$^{17}$ and R$^{18}$ are each as defined above,
R$^{11}$ is hydrogen, cyano, nitro or a radical of the formula —CO—OR$^{17}$ or —CO—NR$^{17}$R$^{18}$ where R$^{17}$ and R$^{18}$ are each as defined above,
R$^{12}$ is cyano, nitro, formyl or a radical of the formula

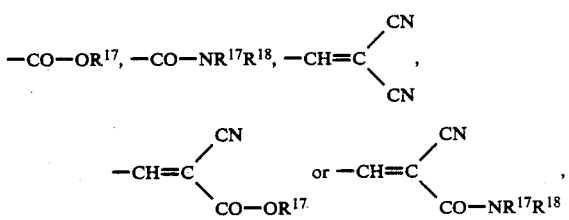

where R$^{17}$ and R$^{18}$ are each as defined above,
R$^{13}$ and R$^{14}$ are identical or different and each is independently of the other hydrogen, C$_1$-C$_4$-alkyl, C$_1$-C$_4$-alkoxy, chlorine, cyano, nitro or a radical of the formula —CO—OR$^{17}$ or —CO—NR$^{17}$R$^{18}$ where R$^{17}$ and R$^{18}$ are each as defined above,
R$^{15}$ is hydrogen, C$_1$-C$_4$-alkyl or chlorine, and
R$^{16}$ is cyano or a radical of the formula —CO—OR$^{17}$ or —CO—NR$^{17}$R$^{18}$ where R$^{17}$ and R$^{18}$ are each as defined above.

2. A process as claimed in 1, wherein there are on the substrate used one or more azo dyes of formula I

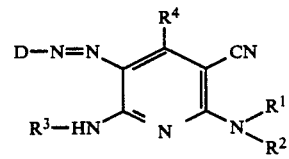

where
R$^1$, R$^2$ and R$^3$ are each independently of the others (a) hydrogen, (b) alkyl or alkoxyalkyl, each having up to 15 carbon atoms and being unsubstituted or substituted by phenyl, C$_1$-C$_4$-alkylphenyl, C$_1$-C$_4$-alkoxyphenyl or cyano, or (c) a radical of the formula III $(-(CH_2)_3-O)_p(-CH_2-CH_2-O)_n-R^6$      (III)

where
n is 1, 2, 3 or 4,
p is 0 or 1 and
R$^6$ is C$_1$-C$_4$-alkyl or phenyl, and R$^4$ is methyl.

* * * * *

UNITED STATES PATENT AND TRADEMARK OFFICE
CERTIFICATE OF CORRECTION

PATENT NO. : 4,939,118

DATED : July 3, 1990

INVENTOR(S) : KARL-HEINZ ETZBACH ET AL

It is certified that error appears in the above-identified patent and that said Letters Patent is hereby corrected as shown below:

Column 30, lines 2-3, delete "Y or $R^5$" and insert --$R^7$, $R^8$ and $R^9$--

Signed and Sealed this

First Day of November, 1994

BRUCE LEHMAN

*Attest:*

*Attesting Officer*  *Commissioner of Patents and Trademarks*